US010777210B2

(12) United States Patent
Garcia

(10) Patent No.: US 10,777,210 B2
(45) Date of Patent: *Sep. 15, 2020

(54) KEY PHRASE DETECTION WITH AUDIO WATERMARKING

(71) Applicant: Google LLC, Mountain View, CA (US)

(72) Inventor: Ricardo Antonio Garcia, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/358,109

(22) Filed: Mar. 19, 2019

(65) Prior Publication Data

US 2019/0214030 A1 Jul. 11, 2019

Related U.S. Application Data

(63) Continuation of application No. 15/824,183, filed on Nov. 28, 2017, now Pat. No. 10,276,175.

(51) Int. Cl.
*G10L 19/018* (2013.01)
*G06F 3/16* (2006.01)
(Continued)

(52) U.S. Cl.
CPC .......... *G10L 19/018* (2013.01); *G06F 3/165* (2013.01); *G06F 21/31* (2013.01); *G10L 15/08* (2013.01);
(Continued)

(58) Field of Classification Search
CPC ....... G10L 19/018; G10L 15/22; G10L 15/08; G10L 2015/223; G10L 2015/088; G06F 3/165
(Continued)

(56) References Cited

U.S. PATENT DOCUMENTS 5,574,962 A 11/1996 Fardeau et al.
5,708,478 A 1/1998 Tognazzini
(Continued)

FOREIGN PATENT DOCUMENTS

WO WO 2016/195890 12/2016
WO WO 2018/118002 6/2018

OTHER PUBLICATIONS

Garcia. "Digital Watermarking of Audio Signals using a Psychoacoustic Auditory Model and Spread Spectrum Theory," 107th Convention, Audio Engineering Society, Sep. 24-27, 1999.
(Continued)

*Primary Examiner* — Jesse A Elbin
(74) *Attorney, Agent, or Firm* — Honigman LLP; Brett A. Krueger

(57) ABSTRACT

Methods, systems, and apparatus, including computer programs encoded on computer storage media, for using audio watermarks with key phrases. One of the methods includes receiving, by a playback device, an audio data stream; determining, before the audio data stream is output by the playback device, whether a portion of the audio data stream encodes a particular key phrase by analyzing the portion using an automated speech recognizer; in response to determining that the portion of the audio data stream encodes the particular key phrase, modifying the audio data stream to include an audio watermark; and providing the modified audio data stream for output.

15 Claims, 3 Drawing Sheets

(51) Int. Cl.
  *G10L 15/08* (2006.01)
  *G10L 15/22* (2006.01)
  *G10L 21/00* (2013.01)
  *G06F 21/31* (2013.01)
  *H04N 21/8358* (2011.01)
  *H04N 21/233* (2011.01)

(52) U.S. Cl.
  CPC .............. *G10L 15/22* (2013.01); *G10L 21/00* (2013.01); *G10L 2015/088* (2013.01); *G10L 2015/223* (2013.01); *H04N 21/233* (2013.01); *H04N 21/8358* (2013.01)

(58) Field of Classification Search
  USPC .......................................................... 700/94
  See application file for complete search history.

(56) References Cited

U.S. PATENT DOCUMENTS

| | | | |
|---|---|---|---|
| 6,737,957 B1 | 5/2004 | Petrovic et al. | |
| 6,871,180 B1 | 3/2005 | Neuhauser et al. | |
| 7,181,159 B2 | 2/2007 | Breen | |
| 7,190,332 B1 | 3/2007 | Webb et al. | |
| 7,209,571 B2 | 4/2007 | Davis et al. | |
| 7,220,071 B2 | 5/2007 | Neuhauser et al. | |
| 7,363,278 B2 | 4/2008 | Schmelzer et al. | |
| 7,415,430 B2 | 8/2008 | Christensen et al. | |
| 7,590,259 B2 | 9/2009 | Levy et al. | |
| 8,151,113 B2 | 4/2012 | Rhoads | |
| 8,254,308 B1 | 8/2012 | Gailloux et al. | |
| 8,358,966 B2 | 1/2013 | Zito et al. | |
| 8,386,258 B2 | 2/2013 | Wang et al. | |
| 8,442,426 B2 | 5/2013 | Wang et al. | |
| 8,577,345 B2 | 11/2013 | Dragt | |
| 8,577,346 B2 | 11/2013 | Dragt | |
| 8,611,506 B2 | 12/2013 | Miller | |
| 8,958,557 B2 | 2/2015 | Watson et al. | |
| 9,548,053 B1 | 1/2017 | Basye et al. | |
| 9,728,188 B1 | 8/2017 | Rosen | |
| 9,792,902 B2 | 10/2017 | Miyasaka | |
| 9,928,840 B2 | 3/2018 | Sharifi | |
| 10,079,024 B1 | 9/2018 | Bhinnanaik | |
| 2003/0018479 A1 | 1/2003 | Oh | |
| 2005/0219366 A1 | 10/2005 | Hollowbush et al. | |
| 2007/0064940 A1 | 3/2007 | Moskowitz et al. | |
| 2009/0259325 A1 | 10/2009 | Topchy | |
| 2013/0054235 A1 | 2/2013 | Mozer et al. | |
| 2014/0071342 A1 | 3/2014 | Winograd et al. | |
| 2015/0100991 A1 | 4/2015 | Risberg et al. | |
| 2015/0294666 A1 | 10/2015 | Miyasaka et al. | |
| 2018/0350356 A1 | 12/2018 | Garcia | |
| 2019/0013033 A1* | 1/2019 | Bhimanaik | G10L 25/51 |
| 2019/0272825 A1* | 9/2019 | O'Malley | H04N 21/42203 |

OTHER PUBLICATIONS

'www.en.wikipedia.org' [online] "Wireless Speaker," Last Update: Aug. 20, 2017 [retrieved on Sep. 8, 2017] Retrieved from Internet: URL<https://en.wikipedia.org/wiki/Wireless_speaker> 3 pages.
PCT International Search Report and Written Opinion issued in International Application No. PCT/US2018/045185, dated Sep. 26, 2018, 17 pages.

* cited by examiner

KEY PHRASE DETECTION WITH AUDIO WATERMARKING

CROSS-REFERENCE TO RELATED APPLICATION

This application is a continuation of U.S. application Ser. No. 15/824,183, filed Nov. 28, 2017, the contents of which are incorporated by reference herein.

BACKGROUND

Automatic speech recognition is one technology that is used in a variety of different devices. One task for this technology is to be able to use voice commands to wake up a device and have basic spoken interactions with the device. For example, it may be desirable for the device to recognize a "hotword" that signals that the device should activate when the device is in a sleep state.

SUMMARY

In some implementations, a playback device may analyze an audio stream for hotwords, keywords, or key phrases. Upon detection of a hotword, a keyword, or a key phrase, the playback device adds an audio watermark to the audio stream. A listening device, which captures presentation of an audio stream by the playback device, uses audio watermarks to determine whether to perform an action upon detection of a hotword, a keyword, or a key phrase. When the listening device determines that a detected hotword, keyword, or key phrase is associated with an audio watermark in an audio stream, the listening device determines to not perform any action responsive to the detected hotword, keyword, or key phrase, e.g., because the detected hotword, keyword, or key phrase was a pre-recorded utterance and not spoken by a person in a physical area near the listening device. When the listening device determines that a detected hotword, keyword, or key phrase is not associated with an audio watermark in an audio stream, the listening device performs a corresponding action, e.g., because the detected hotword, keyword, or key phrase was likely uttered by a person in the physical area near the listening device.

In general, one innovative aspect of the subject matter described in this specification can be embodied in methods that include the actions of receiving, by a playback device, an audio data stream; determining, before the audio data stream is output by the playback device, whether a portion of the audio data stream encodes a particular key phrase by analyzing the portion using an automated speech recognizer; in response to determining that the portion of the audio data stream encodes the particular key phrase, modifying the audio data stream to include an audio watermark; and providing the modified audio data stream for output. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving an audio data stream; determining, before the audio data stream is output by the one or more computers, whether a portion of the audio data stream encodes a particular key phrase by analyzing the portion using an automated speech recognizer; in response to determining that the portion of the audio data stream does not encode the particular key phrase, determining to skip modifying the audio data stream to include an audio watermark based on the portion of the audio data stream that does not encode the particular key phrase; and after determining to skip modifying the audio data stream to include the audio watermark based on the portion of the audio data stream that does not encode the particular key phrase, providing the audio data stream for output. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Modifying the audio data stream to include the audio watermark may include determining whether the received audio data stream includes a watermark for the particular key phrase; and in response to determining that the received audio data stream does not include a watermark for the particular key phrase, modifying the audio data stream to include an audio watermark. Modifying the audio data stream to include the audio watermark may include determining whether the received audio data stream includes a watermark for the particular key phrase; in response to determining that the received audio data stream includes a watermark for the particular key phrase, determining whether specific data is encoded in the watermark by analyzing data encoded in the watermark; and in response to determining that specific data is not encoded in the watermark, modifying the audio data stream to include the audio watermark that encodes the specific data. Modifying the audio data stream to include the audio watermark that encodes the specific data may include modifying the watermark from the received audio data stream to encode the specific data. The specific data may be data for the particular key phrase. The specific data may be data for a source of the audio data stream. The specific data may be data about content encoded in the audio data stream.

In some implementations, the method may include determining, before the audio data stream is output by the playback device, whether a second portion of the audio data stream encodes an occurrence of the particular key phrase by analyzing the second portion using the automated speech recognizer; in response to determining that the second portion of the audio data stream encodes the particular key phrase, determining whether the received audio data stream includes a watermark for the occurrence of the particular key phrase; in response to determining that the received audio data stream includes a watermark for the occurrence of the particular key phrase, determining whether specific data is encoded in the watermark by analyzing data encoded in the watermark; and in response to determining that specific data is not encoded in the watermark, modifying the audio data stream to include the audio watermark that encodes the specific data. The method may include determining, before the audio data stream is output by the playback device, whether a second portion of the audio data stream encodes an occurrence of the particular key phrase by analyzing the second portion using the automated speech recognizer; in response to determining that the second portion of the audio data stream encodes the particular key phrase, determining whether the received audio data stream includes a watermark for the occurrence of the particular key phrase; in response to determining that the received audio data stream includes a watermark for the occurrence of the particular key phrase, determining to skip modifying the audio data stream to include the audio watermark based on the occurrence of the particular key phrase.

In some implementations, the method may include receiving another portion of the audio data stream concurrently with determining, before the audio data stream is played by the playback device, whether the portion of the audio data stream encodes the particular key phrase by analyzing the portion using the automated speech recognizer. The particular key phrase may be fixed. The method may include receiving input defining the particular key phrase prior to determining, before the audio data stream is played by the playback device, whether the portion of the audio data stream encodes the particular key phrase by analyzing the portion using the automated speech recognizer. Receiving the audio data stream may include receiving the audio data stream through a wired or wireless input connection other than a microphone prior to providing the portion of the modified audio data stream for output.

In some implementations, modifying the audio data stream to include the audio watermark may include modifying the audio data stream to include the audio watermark that identifies a source of the audio data stream. Modifying the audio data stream to include the audio watermark may include modifying the audio data stream to include the audio watermark that includes data specifying that the particular key phrase is encoded in the portion of the audio data stream. Modifying the audio data stream to include the audio watermark may include modifying the audio data stream to include the audio watermark that includes data specifying that a key phrase is encoded in the portion of the audio data stream.

The subject matter described in this specification can be implemented in various embodiments and may result in one or more of the following advantages. In some implementations, the systems and methods described below may add an audio watermark to an audio data stream that includes a hotword, a keyword, or a key phrase, to reduce a likelihood that a listening device will perform an action based on the hotword, the keyword, or the key phrase. For instance, the systems and methods described below may use the audio watermark to prevent a listening device from falsely triggering, e.g., waking up or performing another action, based on content included in an audio data stream when the listening device should only trigger based on utterances spoken by a person physically near the listening device, e.g., who is located in the same room as the listening device, at the time the utterance was originally spoken. In some implementations, the systems and methods described below may add an audio watermark to an audio data stream to reduce a likelihood that a listening device will perform an action based on utterances reproduced by playback device, regardless if they are pre-recorded, streamed live, synthetically created by playback device, or a combination of two or more of these.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A playback device may receive an audio data stream, e.g., third party content, and analyzes the audio data stream for a key phrase. The playback device may analyze the audio data stream using a text detector, a hotword detector, or both. When the playback device determines, based on the analysis, that the audio data stream encodes a hotword, a keyword, or a key phrase, the playback device inserts an audio watermark into the audio data stream. The audio watermark may be an ultrasonic signal encoded in the audio data stream. The playback device then audibly presents the modified audio data stream, e.g., using a speaker. The audio watermark may indicate, to any listening devices that capture the modified audio data stream, that the encoded hotword, keyword, or key phrase is produced by another device and not a human speaking in the room, e.g., that includes the listening devices.

In some implementations, the playback device may include a watermark detector. The playback device may use the watermark detector to determine whether the audio data stream, as received, includes a watermark. When the playback device determines that the audio data stream does not already include a watermark, the playback device inserts the audio watermark into the audio data stream. When the playback device determines that the audio data stream, as received, includes a watermark, the playback device determines whether to add another watermark, e.g., an audio watermark. For instance, the playback device may determine what the watermark, included in the received audio data stream, identifies. When the included watermark represents something other than a hotword, a keyword, or a key phrase, the playback device may add the audio watermark to the audio data stream. When the included watermark represents a hotword, a keyword, or a key phrase for which the playback device is analyzing the audio data stream, the playback device may determine to not add another watermark to the received audio data stream.

Figure 1:
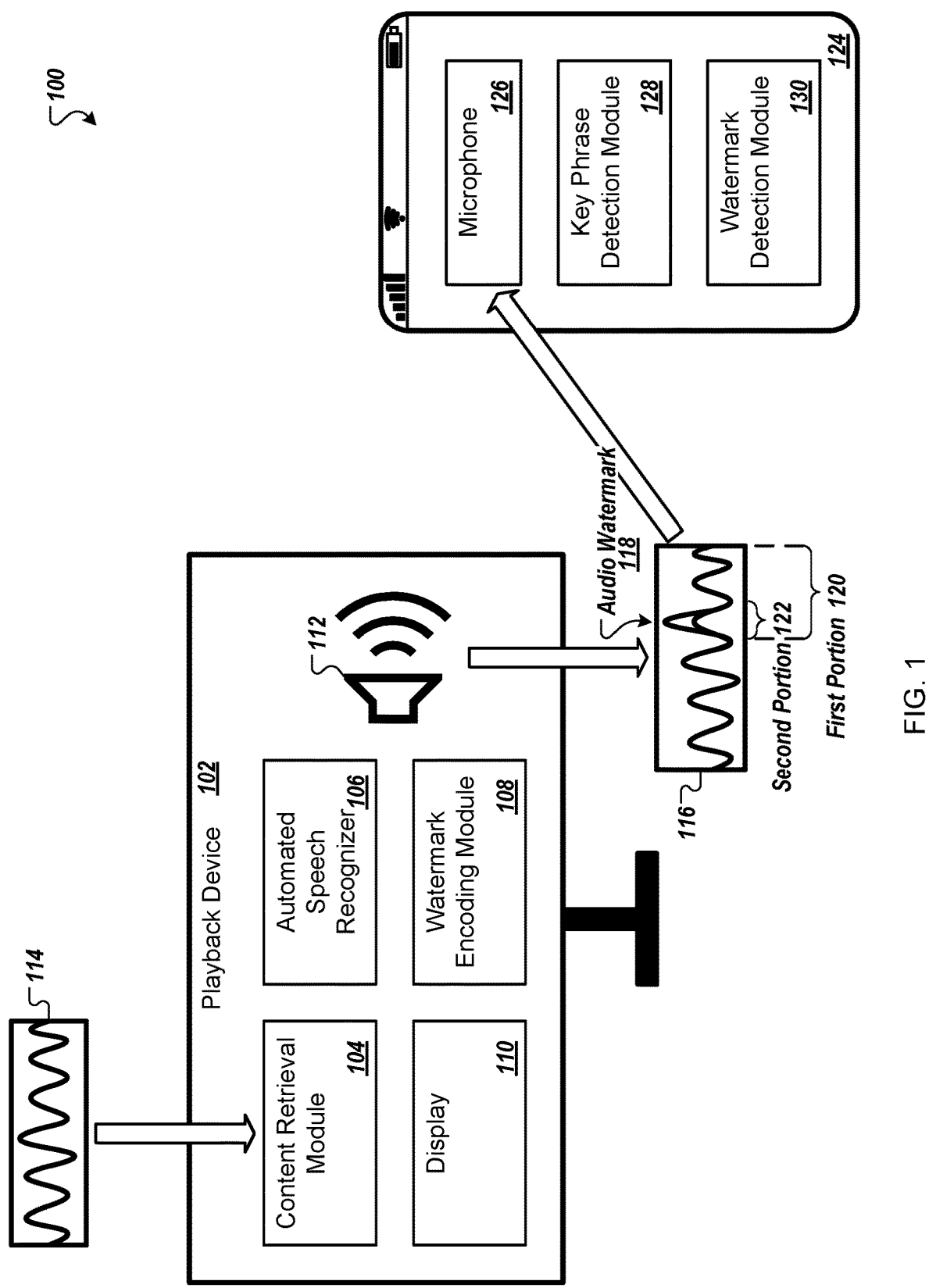
FIG. 1 is an example environment in which a playback device analyzes an audio data stream to determine whether a portion of the audio data stream includes a hotword, a keyword, or a key phrase.

FIG. 1 is an example environment 100 in which a playback device 102 analyzes an audio data stream 114 to determine whether a portion of the audio data stream 114 includes a hotword, a keyword, or a key phrase. In this document, the term "key phrase" is generally understood to include both "keywords" and "hotwords" in addition to key phrases. Some examples of key phrases include wake-up commands, activation commands, or commands to perform particular actions, e.g., initiating a telephone call or launching an application.

A television, as the playback device 102, may receive a video stream for a movie. The television may use an automated speech recognizer 106 to analyze the audio data stream 114 for the video stream and determine whether the audio data stream 114 encodes a hotword. When the television detects a hotword encoded in the audio, the television encodes an audio watermark 118, associated with the detected hotword, in the audio data stream 116. While a smartphone, as a listening device 124, is located near the television, e.g., in the same room as the television, the smartphone may analyze sounds, including the audio for the movie, to determine whether the sounds are utterances of a hotword that will cause the smartphone to perform a particular action. For instance, the listening device 124 may wake-up from a sleep state, e.g., to go from a low power usage state to a higher power usage state, upon detection of a hotword. When the smartphone detects an utterance of the keyword, the smartphone determines whether the utterance is associated with an audio watermark. For instance, when the smartphone detects the hotword in the audio data stream 116 for the movie, the smartphone will also detect the audio watermark 118 which the television added to the audio data stream 116 and, based on detection of both the hotword and the audio watermark 118, determine to maintain the sleep state, perform another action associated with detection of a hotword and a corresponding audio watermark, or both. The other action may include any type of action that is different than if the audio did not include an audio watermark for the hotword, such as logging the detection or logging a universal resource locator presented on the listening device's screen or both. When the smartphone detects an utterance of the hotword that is not associated with an audio watermark, e.g., an utterances spoken by a user, the smartphone will wake-up from the sleep state, e.g., go into a higher powered mode.

The playback device 102 includes a content retrieval module 104 that accesses content for analysis. The content retrieval module 104 can include a wired input, a wireless radio, a radio receiver, or a memory the content retrieval module 104 uses to access the audio data stream 114. For instance, when the content retrieval module 104 includes a wired input, the content retrieval module 104 can receive the audio data stream 114 from a cable television connection or another device connected to the playback device 102 using a wire. When the content retrieval module 104 includes a wireless radio, the content retrieval module 104 can receive the audio data stream 114 from a device that connects to the playback device 102 wirelessly, e.g., via a network. For instance, the content retrieval module 104 may receive the audio data stream 114 as an audio stream, or an audio and video stream, from another device, e.g., a live stream, a synthetically created stream, or both. When the content retrieval module 104 includes a radio receiver, the content retrieval module 104 can receive the audio data stream 114 as part of a radio broadcast, e.g., an amplitude modulation (AM) or a frequency modulation (FM) radio broadcast. When the content retrieval module 104 includes a memory, the content retrieval module 104 can access the audio data stream 114 as part of an audio file or an audio and video file stored in the memory, e.g., a prerecorded audio or video file stored in the memory. The memory may be integrated into the playback device 102, e.g., a hard disk drive or a flash drive, or may be a removable storage unit, e.g., a universal serial bus flash drive or a compact disc or digital versatile disc.

The content retrieval module 104 provides at least part of the audio data stream 114 to an automated speech recognizer 106 (ASR). The automated speech recognizer 106 may be programmed, e.g., when software, or designed, e.g., when hardware, or both, to detect words or phrases encoded in the audio data stream. The automated speech recognizer 106 may detect specific key phrases in a particular language without being able to detect an occurrence of all words in the particular language.

In some examples, the playback device 102 may use an automated hotword detection module that detects one or more hotwords but cannot detect every word in a particular language instead of or in addition to the automated speech recognizer 106. The automated speech recognizer 106, the automated hotword detection module, or both, may be preprogrammed for particular hotwords, e.g., by an administrator. The hotwords may include individual words or phrases that include multiple words.

In some examples, the automated speech recognizer 106 can detect occurrences of multiple different words encoded in an audio data stream in addition to the particular hotwords, keywords, key phrases, or a combination of two or more of these, for which the playback device 102 analyzes the audio data stream. For instance, the automated speech recognizers 106 may be trained to detect words in a particular language, including hotwords, keywords, or key phrases.

The automated speech recognizer 106 may, prior to receipt of at least part of the audio data stream 114, receive input identifying the hotwords, keywords, or key phrases for which the automated speech recognizer 106 analyzes the audio data stream 114. For instance, the playback device 102 may receive user input that identifies the key phrases for which the automated speech recognizer 106 will analyze audio data streams. In some examples, the playback device 102 may receive input from another device, e.g., a smartphone, that identifies the key phrases for which the automated speech recognizer 106 will analyze audio data streams.

The automated speech recognizer 106 analyzes at least part of the audio data stream 114 to determine whether a portion of the audio data stream 114 encodes a hotword, a keyword, or a key phrase for which the automated speech recognizer 106 is configured to detect. For example, as the content retrieval module 104 receives part of the audio data stream 114 and provides the part of the audio data stream 114 to the automated speech recognizer 106, the automated speech recognizer 106 analyzes the part of the audio data stream 114 for encoded occurrences of the hotwords, keywords, or key phrases for which the automated speech recognizer 106 is configured to detect. The content retrieval module 104 can continue to receive additional parts of the audio data stream 114 while the automated speech recognizer 106 determines whether a portion of the audio data stream 114 encodes a hotword, a keyword, or a key phrase.

When the automated speech recognizer 106 detects an occurrence of a hotword, keyword, or key phrase in a portion of the audio data stream 114, the automated speech recognizer 106 provides a message to a watermark encoding module 108. The message may identify the portion of the audio data stream that encodes the detected hotword, keyword, or key phrase.

In response to receipt of the message, the watermark encoding module 108 inserts an audio watermark 118 into the audio data stream 114 to create a modified audio data stream 116. When the message identifies a first portion 120 of the audio data stream 114 that encodes the hotword, the keyword, or the key phrase, the watermark encoding module 108 may insert the audio watermark 118 into a second portion 122 of the audio data stream 114 that is associated with the first portion 120. The second portion 122 may be a sub-portion of the first portion 120, e.g., as shown in FIG. 1. The second portion 122 may overlap with the first portion 120, e.g., the second portion 122 may include data from the audio data stream 114 prior to and including the beginning of the first portion 120, after and including the ending of the first portion 120, or both. The second portion 122 may be included in the audio data stream 114 prior to the beginning of the first portion 120. The second portion 122 may be adjacent to the first portion 120 without a gap between the two portions. The second portion 122 might not overlap with the first portion 120. In some implementations, the second portion 122 may be after the first portion 120.

The watermark encoding module 108 may include a single instance of an audio watermark in the modified audio data stream 116. The watermark encoding module 108 may include multiple audio watermarks in the modified audio data stream 116. Each of the multiple audio watermarks may encode the same data. In some examples, some of the multiple audio watermarks may encode different data.

In some implementations, the playback device 102 may encode additional data in the audio watermark 118. The additional data may indicate a type of the playback device 102, e.g., a television, a stereo receiver, or a computer; a timestamp, e.g., when the playback device 102 inserted the audio watermark into the audio data stream or when the playback device 102 received the audio data stream 114; or a source of the audio data stream 114, e.g., a television station, radio station, a movie name, or a podcast name. A listening device 124 may use the additional data when determining an action to perform.

An audio watermark may identify a source of the audio data stream. For example, an audio watermark may indicate that the playback device 102 received the audio data stream from a content provider, e.g., a particular radio station, television station, cable provider, or another particular content provider.

An audio watermark may identify the particular hotword, keyword, or key phrase encoded in the audio data stream 114. For instance, an audio watermark may include an identifier for the hotword, keyword, or key phrase. The identifier may be any appropriate type of identifier. The identifier may be a numerical value that corresponds with the hotword, keyword, or key phrase. The identifier may be an alphanumeric value that corresponds with the hotword, keyword, or key phrase, e.g., the text of the corresponding hotword, keyword, or key phrase.

In some implementations, an audio watermark may include data specifying that a hotword, a keyword, or a key phrase is encoded in the audio data stream 114. For instance, the data may specify generally that a hotword, a keyword, or a key phrase is encoded in the audio data stream 114 without identifying the specific encoded hotword, keyword, or key phrase.

After the watermark encoding module 108 inserts the audio watermark 118 into the audio data stream 114, the playback device 102 can provide the modified audio data stream 116 for output. For instance, the playback device 102 may present the modified audio data stream 116 using one or more output devices, e.g., a display 110 when the audio data stream 114 is part of a video file, a speaker 112, or both. For example, the playback device 102 may provide the modified audio data stream 116 to the speaker 112 to cause the speaker 112 to present the modified audio data stream 116. The playback device 102 may provide a corresponding video stream to the display 110 for presentation.

The speaker 112 may be integrated into the playback device 102, or external from and connected to the playback device 102. For instance, the speaker 112 may be part of the playback device 102. In some examples, the speaker 112 may connect to the playback device 102 using a wireless connection, e.g., Bluetooth or another wireless network connection. The speaker 112 may connect to the playback device 102 using one or more wires, e.g., optionally using a stereo receiver or another device. In some implementations, the speaker 112 may connect to the playback device 102 using a digital audio and video connection. For example, the playback device 102 may be a universal serial bus device connected to a television or a receiver, which includes the speakers 112.

The playback device 102 may synchronize presentation of the video stream with the modified audio data stream 116. For example, the playback device 102 may ensure that the speaker 112 presents the modified audio data stream 116 while the display 110 concurrently presents a corresponding video portion of the video stream. The playback device 102 may use any appropriate method to incorporate the audio watermark 118 into the modified audio data stream 116, to synchronize presentation of a corresponding video stream with the modified audio data stream 116, or both.

When the automated speech recognizer 106 determines that a portion of the audio data stream 114 does not encode a hotword, a keyword, or a key phrase for which the automated speech recognizer 106 is configured to detect, the automated speech recognizer 106 determines to not provide the watermark encoding module 108 with a message about the portion of the audio data stream 114. In some examples, the automated speech recognizer 106 determines that the playback device 102 should provide the audio data stream 114 for output without modification. Not providing the message to the watermark encoding module 108 allows the playback device 102 to provide the portion of the audio data stream 114 for output without modification, e.g., when the portion of the audio data stream 114 is not adjacent to another portion that encodes a hotword, a keyword, or a key phrase.

A listening device 124 may capture a presented portion of the audio data stream 114, the modified audio data stream 116, or both. For instance, the listening device 124 can include a microphone 126 that captures the presentation of an audio data stream by the speaker 112 included in the playback device 102.

The listening device 124 provides the portion of the captured audio data stream to a key phrase detection module 128. The key phrase detection module 128 may be an automated speech recognizer. The key phrase detection module 128 may be an automated hotword detection module, e.g., programmed to detect only a few specific hotwords. In some examples, the key phrase detection module 128 may be programmed to detect multiple different key phrases.

The key phrase detection module 128 analyzes the portion of the captured audio data stream to determine whether the portion of the captured audio data stream encodes a hotword, a keyword, or a key phrase for which the key phrase detection module 128 is configured to detect. When the key phrase detection module 128 determines that the portion of the captured audio data stream does not encode a hotword, a keyword, or a key phrase for which the key phrase detection module 128 is configured to detect, the key phrase detection module 128 may determine to stop analysis of the portion of the captured audio data stream, that the listening device 124 should not perform an action based on the portion of the captured audio data stream, or both. For example, the listening device 124 may determine not to perform an action based on the portion of the captured audio data stream because the portion of the captured audio data stream may be an unmodified portion of the audio data stream 114, e.g., that does not encode any hotwords, keywords, or key phrases, may encode a hotword, keyword, or a key phrase for which the key phrase detection module 128 is not configured to detect, or both. In some examples, determining to not perform an action may include determining to maintain a sleep state, e.g., and to not exit the sleep state based on detection of the key phrase.

Determining not to perform an action responsive to a detected key phase may allow the listening device 124 to save computational resources, e.g., battery, processor cycles, memory, or a combination of two or more of these. For instance, if the listening device 124 were to wake up or perform an action responsive to the detected key phrase, the listening device 124 may activate additional software applications, hardware functions, or both, that consume one or more computational resources. In the awake mode, the listening device 124 may trigger a process to listen for additional key phrases, spoken after the detected key phrase, and analyze those additional key phrases to determine whether they include a command for the listening device 124. By not performing an action, e.g., by maintaining the sleep state, upon detection of both a key phrase and an audio watermark and by not falsely triggering, the listening device 124 may conserve one or more computational resources.

When the key phrase detection module 128 determines that the portion of the captured audio data stream encodes a hotword, keyword, or key phrase for which the key phrase detection module 128 is configured to detect, the listening device 124 provides data for the portion of the captured audio data stream to a watermark detection module 130. The key phrase detection module 128 may provide a message to the watermark detection module 130 that indicates that the watermark detection module 130 should analyze the captured audio data stream. In some examples, the key phrase detection module 128 may provide a message to another component in the listening device 124 and the other component may trigger the watermark detection module 130 analysis of the captured audio data stream.

In response to receipt of the message, or triggering by the other component, the watermark detection module 130 receives some of the captured audio data stream. The watermark detection module 130 may receive the portion that the key phrase detection module 128 determined included a hotword, a keyword, or a key phrase for which the key phrase detection module 128 is configured to detect. In some examples, the watermark detection module 130 may receive another portion of the captured audio data stream, e.g., that is included in the audio data stream near, adjacent to, or overlapping with the portion that the key phrase detection module 128 determined included a hotword, a keyword, or a key phrase.

The watermark detection module 130 analyzes the captured audio data stream to determine whether the captured audio data stream includes an audio watermark for the hotword, keyword, or key phase the key phrase detection module 128 detected in the captured audio data stream. When the watermark detection module 130 determines that the captured audio data stream includes an audio watermark for the hotword, keyword, or key phase, the listening device 124 determines to not perform an action based on the hotword, keyword, or key phase. For instance, the listening device 124 may determine to remain in a sleep state, not to change from a low power use state to a high power use state, or both. In some examples, when the watermark detection module 130 detects an audio watermark for the hotword, keyword, or key phase, the watermark detection module 130 may provide a message to the listening device 124 that indicates detection of the audio watermark. The listening device 124 may use the message from the watermark detection module 130 to determine to not perform an action, e.g., in conjunction with a message received from the key phrase detection module 128 that indicates detection of a hotword, keyword, or key phase. The listening device 124 may determine, using the message from the watermark detection module 130, that the detected hotword, keyword, or key phase was not likely spoken by a person in a physical area near the listening device and not to perform an action specific to the detected hotword, keyword, or key phrase.

In some implementations, the listening device 124 may perform an action based on detection of both a key phrase and a corresponding audio watermark. The action may be specific to the audio watermark or specific to the combination of the key phrase and the audio watermark but is not specific to only the key phrase. For instance, the listening device 124 may determine to log data based on detection of the audio watermark 118 in the modified audio data stream 116 or based on detection of both the audio watermark 118 and the key phrase in the modified audio data stream 116. The listening device 124 may determine the action using the actual content of the watermark 118, e.g., may store information from the audio watermark such as the originating source of the content, the audio watermark 118, or both, for future use.

When the watermark detection module 130 does not detect an audio watermark for the hotword, keyword, or key phase, the listening device 124 can perform an action for the detected hotword, keyword, or key phase. The action may be activation of the listening device 124, a change from a low power use state to a high power use state, or another action specific to the detected hotword, keyword, or key phrase.

For instance, the listening device 124 may receive a message from the key phrase detection module 128 that indicates that the key phrase detection module 128 detected a hotword, keyword, or key phase encoded in an audio data stream captured by the microphone 126. The listening device 124 may send the watermark detection module 130 an activation message that causes the watermark detection module 130 to analyze the audio data stream for an audio watermark for the detected hotword, keyword, or key phase. When the watermark detection module 130 does not detect an audio watermark for the hotword, keyword, or key phase, the watermark detection module 130 may send a message to the listening device 124 that indicates the non-detection of the audio watermark. The listening device 124 may use both messages, from the key phrase detection module 128 and the watermark detection module 130, to determine that a person in a physical area near the listening device likely spoke the detected hotword, keyword, or key phase, and to perform an action that corresponds with the detected hotword, keyword, or key phase.

In some implementations, the playback device 102 may include a watermark detection module. The playback device 102 may use the watermark detection module to determine whether to add an audio watermark to an audio data stream 114 upon detection of a hotword, a keyword, or a key phrase in the audio data stream 114. For instance, when the automated speech recognizer 106 detects an occurrence of a hotword, keyword, or key phrase in a portion of the audio data stream 114, the automated speech recognizer 106, or the playback device 102, provides a message to the watermark detection module. The watermark detection module uses the message to determine a portion of the audio data stream 114 to analyze. The watermark detection module analyzes the determined portion of the audio data stream 114 to determine whether the determined portion includes a watermark, e.g., an audio watermark, a video watermark, or both. When the watermark detection module determines that the audio data stream 114 does not include a watermark, the playback device 102 proceeds as described above, e.g., the watermark encoding module 108 inserts the audio watermark 118 into the audio data stream to create the modified audio data stream 116.

When the watermark detection module determines that the audio data stream 114 includes a watermark, the watermark detection module determines whether an audio watermark for the detected key phrase should be added to the audio data stream 114. For instance, the watermark detection module determines whether the detected watermark corresponds to the detected key phrase, e.g., whether the detected watermark includes data that identifies the detected key phrase, whether a location for the detected watermark corresponds to a location for the detected key phrase in the audio data stream 114, or both. A first location for a detected watermark may correspond to a second location for the detected key phrase when the first location is within a threshold distance, e.g., time wise, from the second location.

When the watermark detection module determines that the detected watermark does not correspond to the detected key phrase, the playback device 102 causes the watermark encoding module 108 to add an audio watermark, e.g., the audio watermark 118, to the audio data stream 114 to create the modified audio data stream 116. For instance, the watermark detection module determines that the first location is not within the threshold distance from the second location and, in response, the watermark encoding module 108 adds the audio watermark 118 to the audio data stream 114.

When the watermark detection module determines that the detected watermark corresponds to the detected key phrase but does not include specific data for the key phrase, e.g., a source of the audio data stream, the playback device 102 may cause the watermark encoding module 108 to add an audio watermark. For instance, the watermark detection module may determine that the watermark identifies text for the detected key phrase, corresponds in location to a location of the detected key phrase in the audio data stream 114, or both, but does not include the name of a source of the audio data stream. In response, the watermark detection module may determine that the playback device 102 should insert the audio watermark 118 with the name of the source into the audio data stream 114.

When the watermark detection module determines that the playback device 102 should not insert an audio watermark into the audio data stream 114, the playback device 102 determines not to send a message about the detected key phrase to the watermark encoding module 108. For instance, the playback device 102 determines to take no further action based on the detected key phrase, e.g., and to provide the portion of the audio data stream 114 that encodes the detected key phrase for output via the speaker 112.

The playback device 102 may be any appropriate type of device that receives an audio data stream 114, e.g., from a memory or another device, and audibly presents at least a portion of the audio data stream 114, e.g., using the speaker 112. Some examples of playback devices 102 may include televisions, table assistants, smart speakers, smart watches, stereo receivers, e.g., for a car or home stereo, personal computers, or mobile communication devices, e.g., a smartphone. In some examples, the playback device 102 may be a server. In some implementations, the playback device 102 may receive the audio data stream 114 using a web browser that requested the audio data stream 114. Some examples of listening devices 124 may include personal computers, mobile communication devices, personal security systems, Internet of Things devices, and other devices that can capture the audio data presented by the playback device 102, e.g., using the microphone 126.

Figure 2:
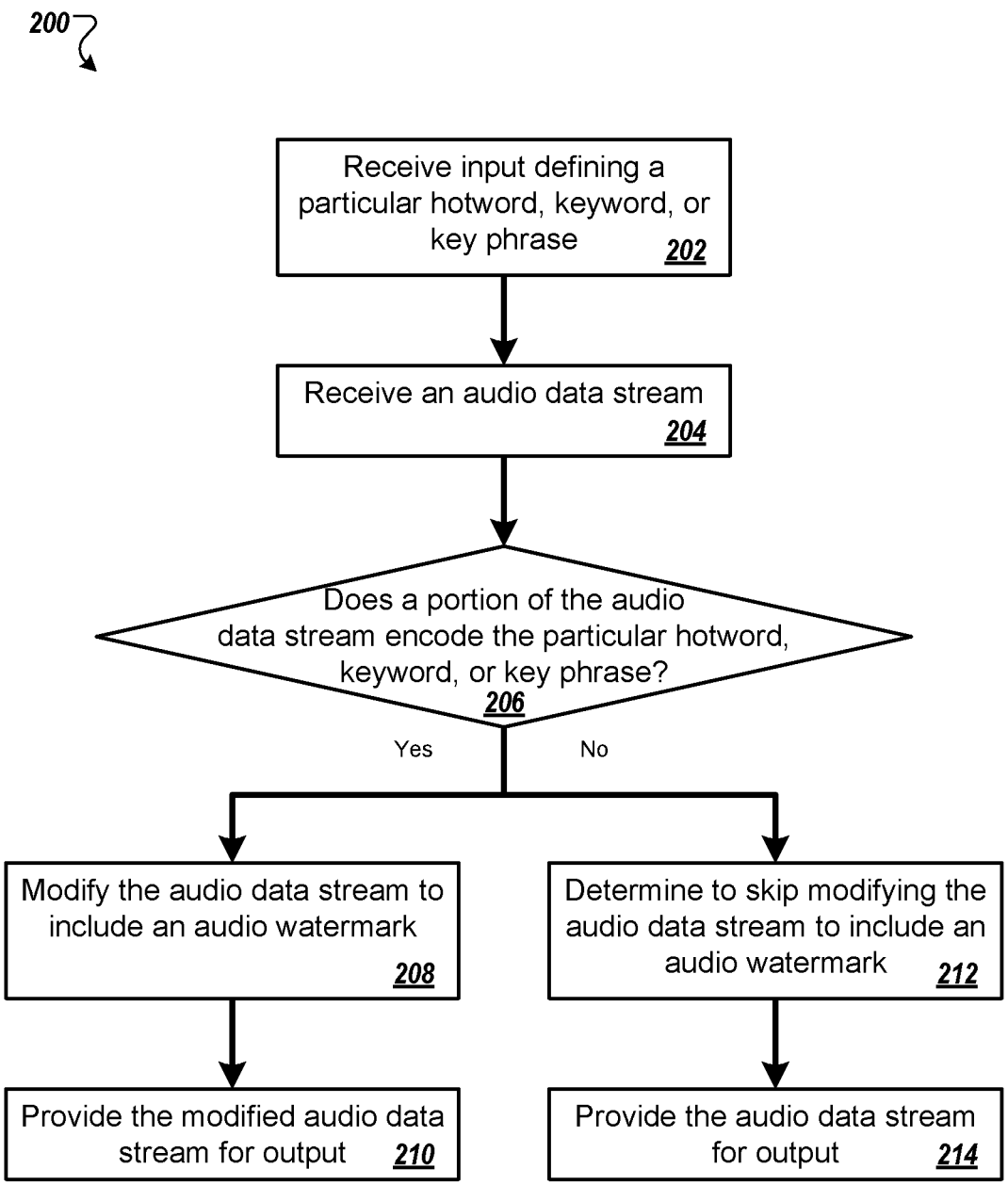
FIG. 2 is a flow diagram of a process for modifying an audio data stream based on key phrase detection.

FIG. 2 is a flow diagram of a process 200 for modifying an audio data stream based on key phrase detection. For example, the process 200 can be used by the playback device 102 from the environment 100.

A playback device receives input defining a particular hotword, keyword, or key phrase (202). For instance, the playback device may receive user input that defines the particular hotword, keyword, or key phrase. The user input may be speech input, e.g., received via a microphone. The user input may be text input, e.g., received via a keyboard or remote control. In some implementations, the particular hotword, keyword, or key phrase may be defined by an administrator, e.g., configuring an automated speech recognizer or an automated hotword detection module included in the playback device.

In some implementations, the playback device may receive the input from another device. For example, the playback device may receive the input from a device that activates in response to receipt of an audio signal encoding a hotword, e.g., the listening device 124. The playback device may receive the input from the other device to allow the playback device to dynamically determine for which hotwords, keywords, or key phrases, upon detection in an audio data stream, to add an audio watermark to the audio data stream.

In some implementations, the particular hotword, keyword, or key phrase may be fixed. For instance, the playback device may have data for one or more predetermined hotwords, keywords, or key phrases. The predetermined hotwords, keywords, or key phrases may be specific to a particular listening device, or a particular type of listening device, e.g., all of which have the same operating system. Use of a fixed hotword, keyword, or key phrase may allow the playback device to add audio watermarks for those phrases in instances when the playback device is not customized for a particular listening device that receives an audio data stream outputted by the playback device. For instance, when the playback device adds audio watermarks to an audio data stream for hotwords, keywords, or key phrases specific to a group of different types of listening devices, e.g., a group of different operating systems, the playback device may reduce a likelihood of a listening device falsely triggering based on encoding of a hotword, keyword, or key phrase in the audio data stream.

In some examples, the playback device may receive input that defines a key phrase from multiple sources. For instance, the playback device may receive user input that defines a first hotword from a first user and second input that defines a second hotword, or key phrase, from a listening device, e.g., operated by a second user. The playback device may use data for both the first hotword and the second hotword to analyze audio data streams and determine whether to add an audio watermark to an audio data stream.

The playback device receives an audio data stream (204). For instance, the playback device receives the audio data stream from a content provider. The content provider may be any appropriate type of content provider. Some examples of content providers include a streaming media provider, a cable provider, and an audio streaming provider.

The playback device may receive the audio data stream prior to providing the portion of the audio data stream for output. The playback device may receive the audio data stream through a wired or wireless input connection other than a microphone.

The playback device determines whether a portion of the audio data stream encodes the particular hotword, keyword, or key phrase (206). The playback device may use any appropriate method, system, or both, to determine whether a portion of the audio data stream encodes the particular hotword, keyword, or key phrase. For instance, the playback device may use an automated speech recognizer to analyze the portion of the audio data stream and determine whether the portion encodes a hotword, a keyword, or a key phrase.

In some examples, the playback device may determine whether any one of multiple hotwords, keywords, key phrases, or a combination of two or more of these, is encoded in the audio data stream. For instance, the playback device may determine whether the portion of the audio data stream encodes either a particular keyword or a particular key phrase.

The playback device may receive another portion of the audio data stream concurrently with determining, before the audio data stream is output by the playback device, whether the portion of the audio data stream encodes the particular hotword, keyword, or key phrase by analyzing the portion using the automated speech recognizer. For instance, the playback device may receive a first portion of the audio data stream. While the playback device analyzes the first portion of the audio data stream using the automated speech recognizer, the playback device may concurrently receive a second portion of the audio data stream. The second portion may be subsequent to the first portion without any intermediary portions of the audio data stream. In some examples, the second portion may be subsequent to the first portion with an intermediary portion of the audio data stream between the first portion and the second portion.

When the playback device determines that a portion of the audio data stream encodes the particular hotword, keyword, or key phrase, the playback device modifies the audio data stream to include an audio watermark (208). For example, the playback device may determine a portion of the audio data stream in which to include the audio watermark. The determined portion may be the portion that encodes the hotword, keyword, or key phrase. The determined portion may be another portion of the audio data stream, different from the portion that encodes the hotword, the keyword, or the key phrase.

The playback device may determine an audio watermark to include in the audio data stream. In some examples, the playback device may dynamically generate the audio watermark, e.g., using data for the audio data stream. For instance, the playback device can determine data for a source of the audio data stream, data for the encoded hotword, keyword, or key phrase, or both, and include the determined data in the audio watermark. In some implementations, the playback device may select an audio watermark from a database of audio watermarks. For example, the playback device may use a source of the audio data stream, the encoded hotword, keyword, or key phrase, or both, to select an audio watermark from the database. The playback device may include the selected audio watermark in the audio data stream.

The playback device provides the modified audio data stream for output (210). For example, in response to modifying the audio data stream to include the audio watermark, the playback device may provide the modified audio data stream for output. Providing the modified audio data stream for output may cause a speaker, included in the playback device, to present, e.g., audibly, the modified audio data stream.

When the playback device determines that the portion of the audio data stream does not encode the particular hotword, keyword, or key phrase, the playback device determines to skip modifying the audio data stream to include an audio watermark (212). For instance, the playback device determines to not modify the audio data stream based on the portion of the audio data stream that does not encode the particular hotword, keyword, or key phrase. The playback device may determine to skip modification of a proceeding portion of the audio data stream that is prior to the portion of the audio data stream that does not encode the particular hotword, keyword, or key phrase.

In some implementations, when the playback device determines to modify the audio data stream, the playback device may determine to modify a portion of the audio data stream for which the playback device previously determined to skip modification of the audio data stream. For instance, the playback device may analyze two different portions of an audio data stream, a first portion and a second portion. The playback device may determine that the first portion does not encode a hotword, a keyword, or a key phrase and, in response, to skip modification of the audio data stream based on the first portion. The playback device may then analyze the second portion, as a portion of the audio data stream subsequent and adjacent to the first portion of the audio data stream. The playback device may determine that the second portion of the audio data stream encodes the particular hotword, keyword, or key phrase and, in response, to modify the audio data stream. In response to the modification determination, the playback device may determine to include an audio watermark in the first portion of the audio data stream.

The playback device provides the audio data stream for output (214). For instance, in response to determining to skip modifying the audio data stream, the playback device may provide the audio data stream, or a portion of the audio data stream, for output. The playback device may provide the audio data stream to a speaker to cause the speaker to present the audio data stream, or the portion of the audio data stream.

The order of steps in the process 200 described above is illustrative only, and modifying the audio data stream based on hotword detection can be performed in different orders. For example, the playback device may receive a portion of an audio data stream, receive input defining the particular hotword, and then determine whether a portion of the audio data stream encodes the particular hotword.

In some implementations, the process 200 can include additional steps, fewer steps, or some of the steps can be divided into multiple steps. For example, the playback device may receive the audio data stream, determine whether a portion of the audio data stream encodes the particular hotword, and, if so, modify the audio data stream to include the audio watermark, e.g., perform steps 204 through 208. After performing these steps, the playback device may provide the modified audio data stream for output.

In some implementations, a playback device may perform one or more steps of the process 200 multiple times. For instance, the playback device may receive an audio data stream, determine that a first portion of the audio data stream encodes the particular hotword, and modify the audio data stream, e.g., a second portion near the first portion that potentially includes at least some of the first portion. The playback device may then receive a third portion of the audio data stream, determine that the second portion does not encode the particular hotword, and determine to skip modification of a fourth portion of the audio data stream. The second portion may be selected to allow a listening device, which receives the modified audio data stream, to use the audio watermark to identify the particular hotword and act accordingly based on the combination of the audio watermark and the particular hotword. For example, the playback device may select a location of the second portion to allow a listening device to detect both the audio watermark and the particular hotword and response accordingly, e.g., to not take any action based on receipt of both the audio watermark and the particular hotword. The listening device may determine not to perform an action based on the particular hotword because of receipt of the audio watermark in the second portion of the audio data stream. In some examples, the second portion may be the same portion of the audio data stream as the first portion. In some examples, the second portion may include a portion of the audio data stream prior to the first portion, and may include some of the first portion. The fourth portion of the audio data stream may be selected based on the location of the third portion in the audio data stream. For instance, the fourth portion may be the same portion of the audio data stream as the third portion.

In some implementations, the playback device may encode an audio watermark, or multiple different audio watermarks, in the audio data stream until the playback device determines that a portion of the audio data stream encodes the particular hotword, keyword, or key phrase. For instance, the playback device may encode an audio watermark in each portion of the audio data stream that does not include a hotword, a keyword, or a key phrase. This may allow a listening device to capture presentation of an audio data stream by the playback device and determine which portions of the captured audio data stream include an audio watermark. The listening device could then analyze, with a key phrase detection module, only those portions of the captured audio data stream that include an audio watermark and, in response, perform an action that corresponds to the detected key phrase. When the listening device determines that a portion of the captured audio data stream does not include an audio watermark, the listening device may determine to skip analysis, by the key phrase detection module, of the portion that does not include the audio watermark.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

Figure 3:
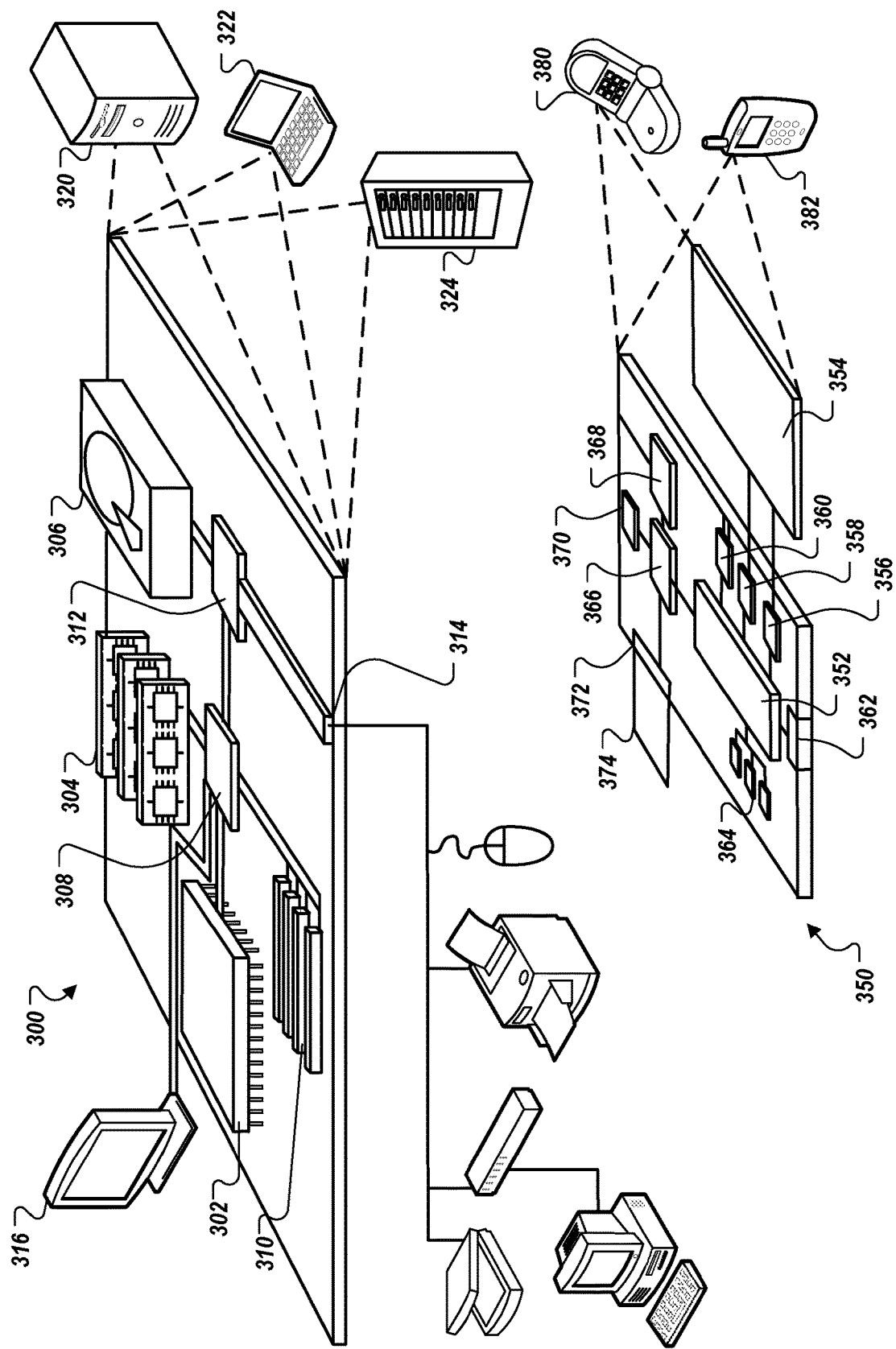
FIG. 3 is a block diagram of a computing system that can be used in connection with computer-implemented methods described in this document.

FIG. 3 is a block diagram of computing devices 300, 350 that may be used to implement the systems and methods described in this document, as either a client or as a server or plurality of servers. Computing device 300 is intended to represent various forms of digital computers, such as laptops, desktops, workstations, personal digital assistants, smartphones, smart televisions, tabletop assistants, smart speakers, servers, blade servers, mainframes, and other appropriate computers. Computing device 350 is intended to represent various forms of mobile devices, such as personal digital assistants, cellular telephones, smartphones, smart-watches, smart televisions, smart speakers, tabletop assistants, head-worn devices, and other similar computing devices. The components shown here, their connections and relationships, and their functions, are meant to be exemplary only, and are not meant to limit implementations described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a computer-readable medium. In one implementation, the memory 304 is a volatile memory unit or units. In another implementation, the memory 304 is a non-volatile memory unit or units.

The storage device 306 is capable of providing mass storage for the computing device 300. In one implementation, the storage device 306 is a computer-readable medium. In various different implementations, the storage device 306 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 304, the storage device 306, or memory on processor 302.

The high speed controller 308 manages bandwidth-intensive operations for the computing device 300, while the low speed controller 312 manages lower bandwidth-intensive operations. Such allocation of duties is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a speaker, a microphone, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can process instructions for execution within the computing device 350, including instructions stored in the memory 364. The processor may also include separate analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD display or an OLED display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provided in communication with processor 352, so as to enable near area communication of device 350 with other devices. External interface 362 may provide, for example, for wired communication (e.g., via a docking procedure) or for wireless communication (e.g., via Bluetooth or other such technologies).

The memory 364 stores information within the computing device 350. In one implementation, the memory 364 is a computer-readable medium. In one implementation, the memory 364 is a volatile memory unit or units. In another implementation, the memory 364 is a non-volatile memory unit or units. Expansion memory 374 may also be provided and connected to device 350 through expansion interface 372, which may include, for example, a SIMM card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provided as a security module for device 350, and may be programmed with instructions that permit secure use of device 350. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS receiver module 370 may provide additional wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smartphone 382, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   receiving an audio data stream;
   determining whether a portion of the audio data stream encodes a particular key phrase by analyzing the portion using an automated speech recognizer;
   in response to determining that the portion of the audio data stream encodes the particular key phrase, modifying the audio data stream to include an audio watermark that includes data specifying that the particular key phrase is encoded in the portion of the audio stream; and
   providing the modified audio data stream for output.

2. The method of claim 1, wherein modifying the audio data stream to include the audio watermark comprises:
   determining whether the received audio data stream includes a watermark for the particular key phrase; and
   in response to determining that the received audio data stream does not include a watermark for the particular key phrase, modifying the audio data stream to include the audio watermark.

3. The method of claim 1, wherein modifying the audio data stream to include the audio watermark comprises:
   determining whether the received audio data stream includes a watermark for the particular key phrase;
   in response to determining that the received audio data stream includes a watermark for the particular key phrase, determining whether specific data is encoded in the watermark by analyzing data encoded in the watermark; and
   in response to determining that specific data is not encoded in the watermark, modifying the audio data stream to include the audio watermark that encodes the specific data.

4. The method of claim 3, wherein modifying the audio data stream to include the audio watermark that encodes the specific data comprises modifying the watermark from the received audio data stream to encode the specific data.

5. The method of claim 3, wherein the specific data comprises data for the particular key phrase.

6. The method of claim 3, wherein the specific data comprises data for a source of the audio data stream.

7. The method of claim 3, wherein the specific data comprises data about content encoded in the audio data stream.

8. The method of claim 1, further comprising receiving another portion of the audio data stream concurrently with determining whether the portion of the audio data stream encodes the particular key phrase by analyzing the portion using the automated speech recognizer.

9. The method of claim 1, wherein the particular key phrase is fixed.

10. The method of claim 1, further comprising receiving input defining the particular key phrase prior to determining whether the portion of the audio data stream encodes the particular key phrase by analyzing the portion using the automated speech recognizer.

11. The method of claim 1, wherein receiving the audio data stream comprises receiving the audio data stream through a wired or wireless input connection other than a microphone prior to providing the portion of the modified audio data stream for output.

12. The method of claim 1, wherein modifying the audio data stream to include the audio watermark comprises modifying the audio data stream to include the audio watermark that identifies a source of the audio data stream.

13. A system comprising:
   one or more computers and one or more storage devices storing instructions that are operable, when executed by the one or more computers, to cause the one or more computers to perform operations comprising:
   receiving an audio data stream;
   determining whether a portion of the audio data stream encodes a particular key phrase by analyzing the portion using an automated speech recognizer;
   in response to determining that the portion of the audio data stream encodes the particular key phrase, modifying the audio data stream to include an audio watermark that includes data specifying that the particular key phrase is encoded in the portion of the audio stream; and
   providing the modified audio data stream for output.

14. The system of claim 13, wherein modifying the audio data stream to include the audio watermark comprises:
   determining whether the received audio data stream includes a watermark for the particular key phrase; and
   in response to determining that the received audio data stream does not include a watermark for the particular key phrase, modifying the audio data stream to include the audio watermark.

15. The system of claim 13, wherein modifying the audio data stream to include the audio watermark comprises:
   determining whether the received audio data stream includes a watermark for the particular key phrase;
   in response to determining that the received audio data stream includes a watermark for the particular key phrase, determining whether specific data is encoded in the watermark by analyzing data encoded in the watermark; and
   in response to determining that specific data is not encoded in the watermark, modifying the audio data stream to include the audio watermark that encodes the specific data.

* * * * *